Nov. 11, 1947. W. G. BRIGGS 2,430,665
BEET HARVESTER WITH TOPPER
Filed Oct. 17, 1944 5 Sheets-Sheet 3

Inventor
W. G. BRIGGS
By Ross J. Woodward
Attorney

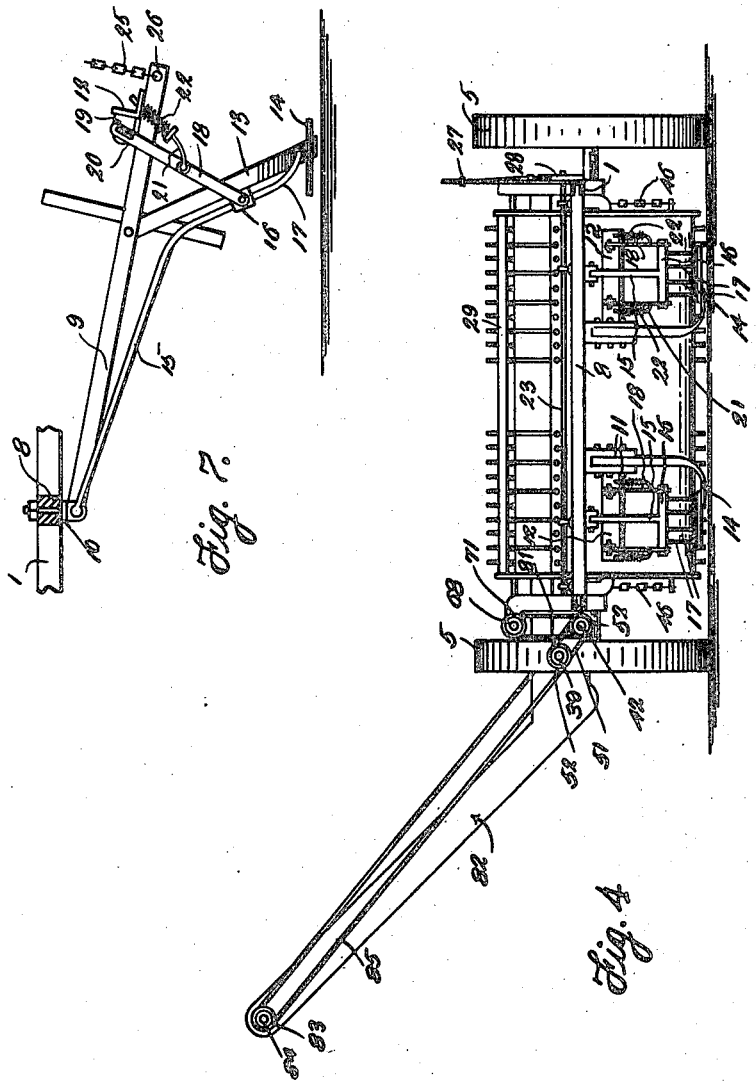

Nov. 11, 1947.  W. G. BRIGGS  2,430,665
BEET HARVESTER WITH TOPPER
Filed Oct. 17, 1944  5 Sheets-Sheet 5
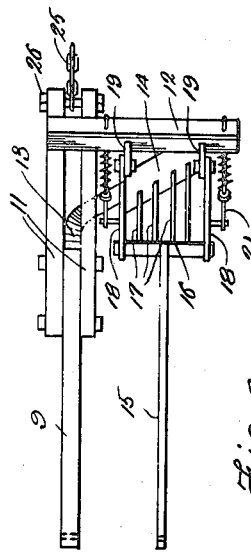
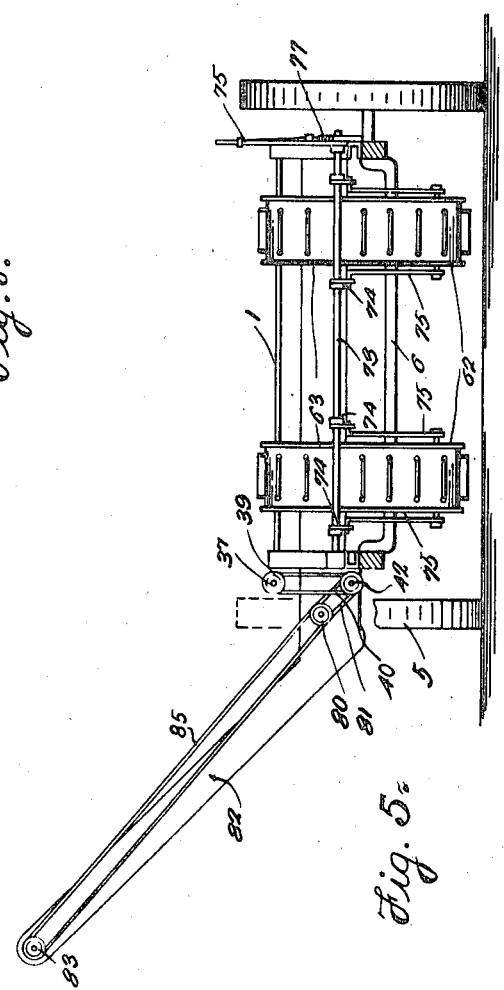
Inventor
W. G. BRIGGS Patented Nov. 11, 1947

2,430,665

UNITED STATES PATENT OFFICE 2,430,665

BEET HARVESTER WITH TOPPER

Walter G. Briggs, Ault, Colo.

Application October 17, 1944, Serial No. 558,991

1 Claim. (Cl. 55—107)

This invention relates to agricultural machines and more particularly to a beet harvester, it being one object of the invention to provide a harvester by means of which beets may be topped, the tops being delivered from the harvester onto the ground at a side of the harvester.

Another object of the invention is to provide a harvester having the topper so constructed that it may be adjusted to cut the tops with minimum loss of the beet root and the tops carried upwardly from the topping mechanism and delivered from the harvester at a side thereof.

Another object of the invention is to provide a beet harvester which is simple in construction, very efficient in operation, and very sturdy.

In the accompanying drawings:

Fig. 4 is a view taken on the line 4—4 of Fig. 1.

Fig. 5 is a view taken on the line 5—5 of Fig. 1.

Fig. 6 is a view looking down upon the topping mechanism.

Fig. 7 is a side view of the topping mechanism.

Figure 1:
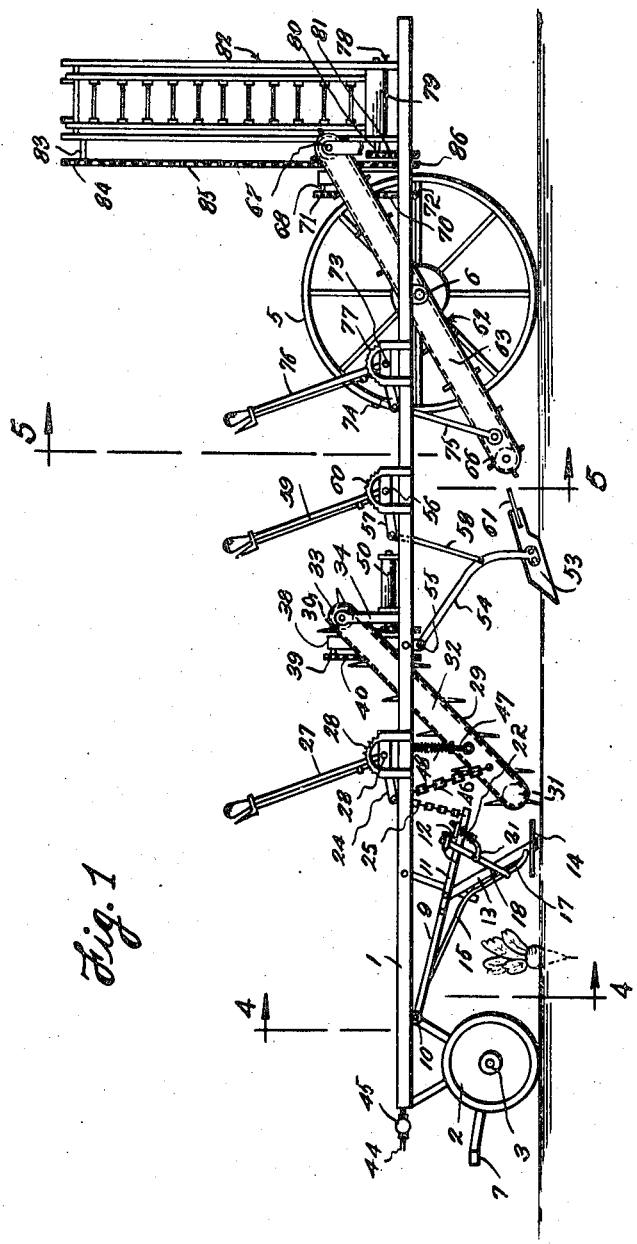
Fig. 1 is a side elevation of the improved beet harvester.

This improved beet harvester has a frame, indicated in general by the numeral 1, supported at its front end by wheels 2 carried by an axle 3, the rear end of the frame being supported by wheels 5 carried by an axle 6. The usual draft bar 7 is provided at the front of the frame in order that it may be hitched back of a tractor. A bar 8 extends transversely of the frame adjacent the front end thereof and carries beams 9 which are pivoted to brackets 10 carried by the bar. The beams 9 carry forks 11 to which are secured side bars 12 formed of angle metal, and each set of forks has secured between them the shank 13 of a blade 14 by means of which beet tops are to be severed from the beet roots. These blades extend diagonally so that as the machine is drawn across a field longitudinally of rows of beets, the blades will have slicing engagement with the beet roots and slice through the roots. The beet roots should be cut close to the tops so that waste due to improper cutting will be reduced to a minimum. In order to do so, there have been provided guides or gauges located in advance of the knives and each having a shank or handle 15 to the rear end of which is fixed a cross bar or head 16 carrying fingers 17. The shanks 15 are carried by the cross bar 8 in transverse spaced relation to beams 9 so that the gauges are disposed directly in front of the knives 14 and ride across the beet crowns before the knives reach the roots. Links 18 connect ends of the cross heads 16 with brackets 19 carried by the bars 12 and are slotted, as shown at 20 in Fig. 7, so that restricted independent movement of the gauges with respect to the beams 9 will be permitted.

Rods 21 extend upwardly and rearwardly from the links 18, with their upper portions passing through openings in the bars 12, and these rods carry springs 22 to yieldably resist upward movement of the links and gauges relative to the beams 9. Due to this construction, the beams will follow vertical movements of the gauges as the gauges pass over the beet crowns and the knives will be caused to slice through the roots close to the beet tops and only a small portion of the roots will remain attached to the tops. Violent jars are prevented when the fingers of the gauge strike a beet root since the links may shift upwardly and compress the springs 22. The cutters must be suspended from the ground and, in order to do so, there has been provided a rocker shaft 23 which is rotatably mounted transversely of the frame and carries arms 24 which project forwardly therefrom and are connected with the forks 11 of beams 9 by chains 25 having their lower ends secured to the forks 11 of the beams by bolts or pins 26. A latch lever 27 is carried by the rocker shaft 23 in order that the shaft may be turned to raise or lower the cutting mechanism and when the latch of this lever is engaged with the rack 28, the cutting mechanism will be held in the adjusted position. While two topping mechanisms have been shown in the machine illustrating the invention, and also two digging mechanisms which will be hereinafter described, it will be understood that the machine may be constructed to gather beets from three or more rows at a time, instead of two rows, or the machine can be designed to remove beets from a single row.

Back of the topping mechanism is an elevating conveyor 29 having cross slats carried by two endless chains trained about sprockets 30 and 31 at upper and lower ends of a conveyor frame indicated in general by the numeral 32. The shaft 33 carrying the upper sprockets 30 is rotatably mounted in bearing brackets 34 at opposite sides of the main frame 1, and this shaft carries a beveled gear 35 meshing with a beveled gear 36 upon a transmission shaft 37 which is rotatably carried by a bracket 38 and, at its front end carries a sprocket wheel 39. A sprocket chain 40 is trained about sprocket wheel 39 and also about a sprocket wheel 41 carried by a drive shaft extending longitudinally of the main frame at one side thereof. This shaft 42 is rotatably mounted in brackets 43 projecting laterally from the main frame and, at its front end, is connected with a power take-off shaft 44 by a joint 45, it being understood that the shaft 44 receives rotary motion from the tractor used for drawing the harvester across a field. The lower forward portion of the conveyor is connected with the arms 24 of shaft 23 by chains 46 so that this end of the conveyor will be vertically adjusted with the cutting mechanism and retained in such relation thereto that beet tops cut by the knives will be engaged by prongs of the conveyor slats and carried upwardly and rearwardly along the conveyor. Rods 47 extend upwardly from opposite sides of the conveyor frame and are slidably engaged through eyes 48 at sides of the main frame, springs 49 being provided about the rods 47 to yieldably resist upward movement of the conveyor. When the beet tops reach the upper end of the elevating conveyor they are dropped therefrom onto a discharging conveyor 50 which extends transversely of the main frame back of the lifting conveyor 29. Motion is imparted to the belt of conveyor 50 by a sprocket chain 51 trained about sprocket wheels 52 carried by the shaft 42 and the shaft for one roller of the conveyor. This discharging conveyor projects slightly from a side of the main frame and, as the harvester is moved across a field, the beet tops will be dropped upon the ground where they are allowed to dry and cure and are then removed and used as feed for livestock.

After the tops have been removed from the roots and disposed of, the roots are to be dug from the ground. To accomplish this, there have been provided digging blades 53 arranged in pairs back of the topping knives. These digging blades are carried by beams 54 pivoted to a cross bar 55 extending across the main frame back of the discharge conveyor 50 and, in order to vertically adjust the blades so that they enter the ground a predetermined depth, there has been provided a rocker shaft 56 extending across the main frame and carrying forwardly projecting arms 57 which are connected with the beams 54 by links or rods 58, so that when the shaft 56 is turned through the medium of its latch lever 59, the blades or shovels will be raised or lowered, according to the direction in which the shaft is turned, and held in adjusted position when the latch of the lever is engaged with the rack 60. The companion blades or shovels converge rearwardly so that beet roots lifted from the ground will move rearwardly between the blades and, at their rear ends, the blades carry rods or fingers 61 which are of such resiliency that they will serve as shakers and assist in removing dirt from the beets. They also lift beets out of the ground.

After the beets have been lifted from the ground and freed of dirt, they pass from the digging mechanism to elevating conveyors 62. These conveyors extend rearwardly at an upward incline and each has a frame 63 extending rearwardly at an upward incline over the shaft or axle 6 carrying the rear wheels of the main frame. Each elevating conveyor 62 also includes an endless chain 64 of the potato type trained about upper sprockets and lower sprockets 65 and 66, the upper sprockets being carried by a shaft 67 which pivotally mounts the conveyor frames and is rotated from shaft 42 through the medium of a transmission shaft 68 geared to shaft 67 by bevelled gears 69 and driven from shaft 42 by a sprocket chain 70, which sprocket chain is trained about sprocket wheels 71 and 72 carried by shafts 68 and 42 respectively.

A rocker shaft 73 is rotatably mounted across the main frame over forward portions of the conveyors 62 and carries arms 74 which are connected with frames of these conveyors by links or rods 75 so that when the shaft 73 is turned, the elevating conveyors will be tilted and their lower front ends disposed in proper relation to the blades 53 to receive beets therefrom. Shaft 73 is turned by means of a latch lever 76 and when its latch is engaed with the rack 77, the conveyors 62 will be held in adjusted position.

Figure 2:
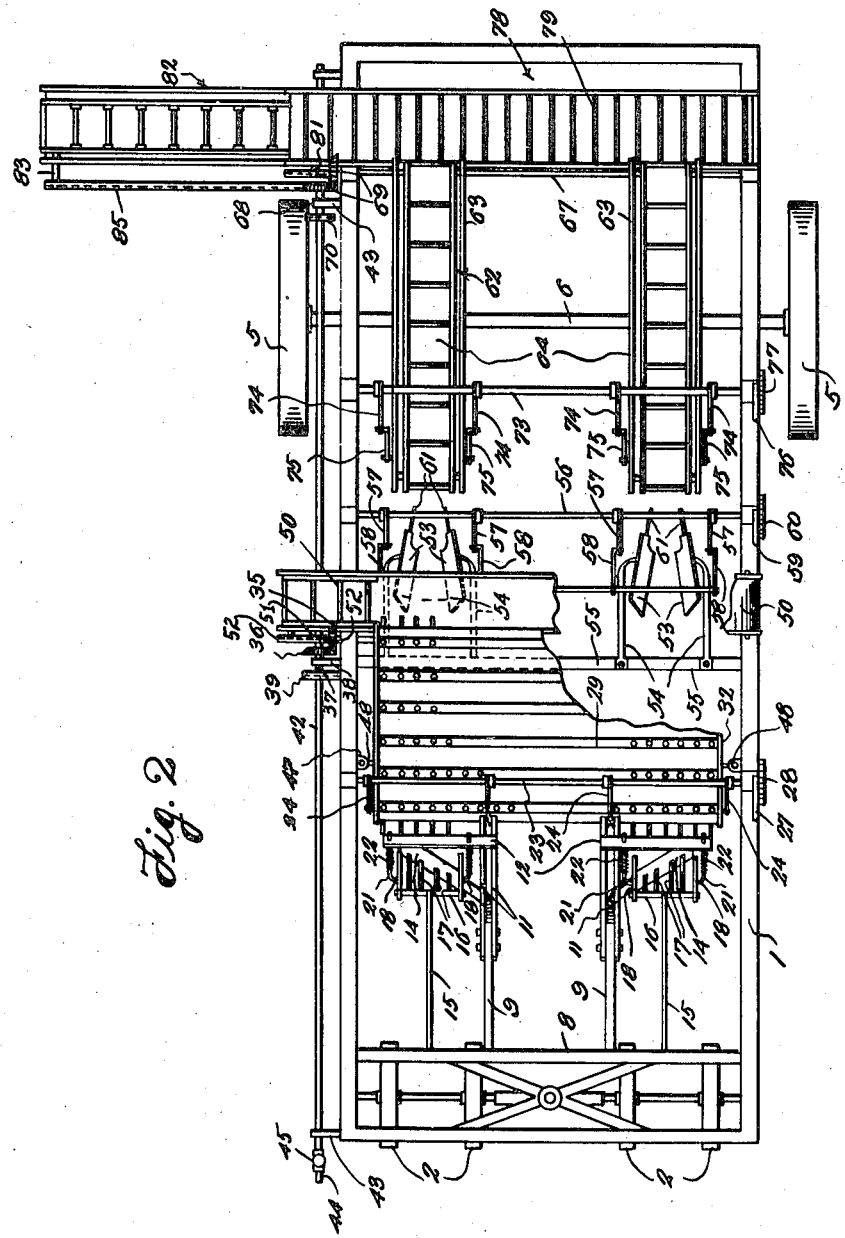
Fig. 2 is a top plan view of the improved beet harvester.
Figure 3:
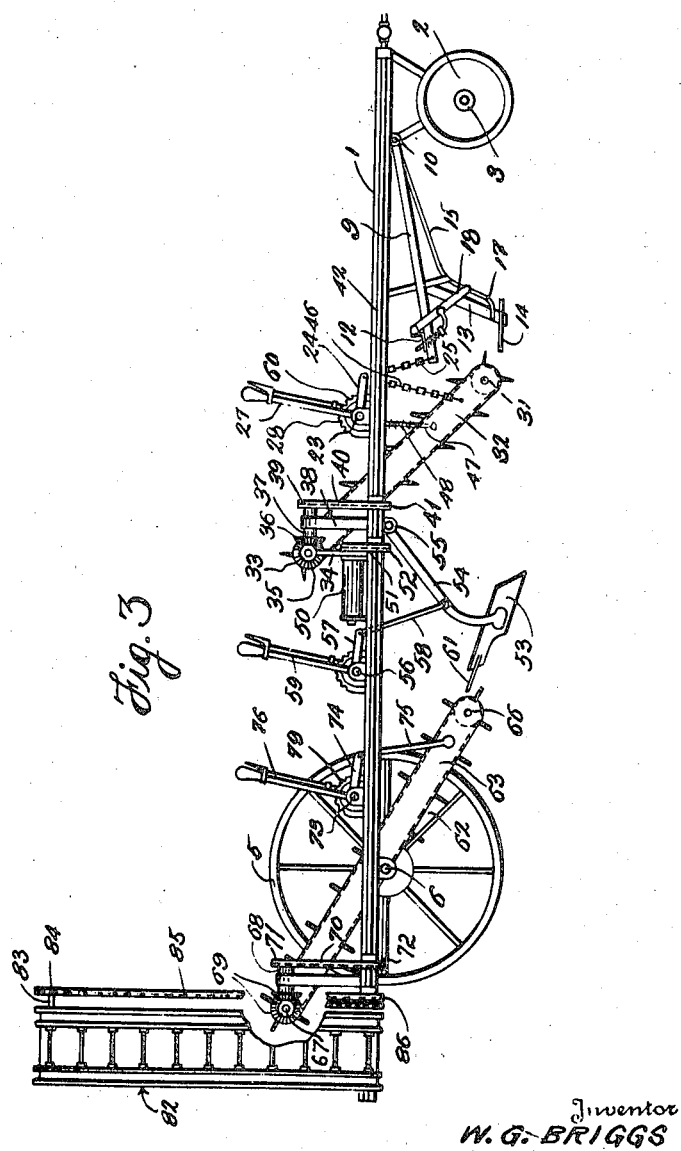
Fig. 3 is a view looking at the opposite side of the machine from that shown in Fig. 1.

When the beets drop from the digging blades onto the conveyors 62 they are carried upwardly and pass from rear ends of these conveyors onto a transversely extending transfer conveyor 78 which has an endless chain 79 trained about rollers at ends of its frame. The roller at one end of the conveyor frame is carried by a shaft 80 driven from shaft 42 by a sprocket chain 81 trained about sprocket wheels on the shafts, and from an inspection of Fig. 2, it will be seen that when the beets reach this end of the transfer conveyor 78 they will be delivered onto the lower inner end of a discharge conveyor 82. The discharge conveyor 82 extends outwardly from the side of the main frame at an upward incline and its outer end is at such distance above the ground that a wagon may be disposed under it to receive beets instead of allowing them to drop to the ground. The frame of the discharge conveyor 82 is firmly secured to the main frame of the harvester in any desired manner and the endless belt of this conveyor is trained about rollers at inner and outer ends of the frame. The roller at the outer or upper end of conveyor 82 is carried by a shaft 83 which projects laterally from the frame of the conveyor and carries a sprocket wheel 84 for engagement by a sprocket chain 85 extending longitudinally of the conveyor and having its lower or inner end portion trained about a sprocket wheel 86 carried by shaft 42. It will thus be seen that all of the conveyors have their endless belts driven from shaft 42 which, in turn, is driven from the power take-off of a tractor. A harvester so constructed is very efficient and effective in operation as it can be drawn across a field behind a tractor and, as it moves forwardly, beets will be topped, then lifted from the ground, and delivered to the elevating conveyors which discharge them onto the transversely extending conveyor so that they will be carried toward a side of the harvester and delivered to the upwardly and outwardly extending discharge conveyor from which they drop into a wagon accompanying the harvester. As the tops are cut from the beet roots they are taken up by the elevating conveyor 32 which delivers them onto the discharge conveyor 50 so that they will be moved toward the side of the harvester and discharged onto the ground where they are allowed to cure before being removed for use as stock feed.

While it has been stated that the harvester is hitched back of a tractor and the drive shaft at one side thereof connected with the power take-off of the tractor, it will be understood that this harvester may be built and mounted directly on a tractor having sufficient power and with good clearance under the motor, this arrangement allowing short turns to be made at ends of beet rows.

Having thus described the invention, what is claimed is:

A beet harvester comprising a main frame, topping means carried by said frame for cutting tops from beet roots including a beam extending longitudinally of said frame and pivoted at its front end for vertical swinging movement, a blade having a shank carried by and depending from said beam, adjusting means carried by said frame and connected with said beam for shifting the beam and the blade to adjusted position, a side bar carried by said beam and extending from one side thereof, a gauge having a handle extending longitudinally of said frame in transverse spaced relation to a side of the beam, a cross head at the rear end of said handle, fingers carried by said cross head and extending rearwardly toward said blade, links carried by said cross head and slidably engaged with said side bar, rods carried by said links and slidably passing through the side bar, springs about said rods yieldably resisting upward movement of the links and the handle, and conveyor means carried by said frame back of the topping means for receiving tops cut from beet roots.

WALTER G. BRIGGS.

REFERENCES CITED

The following references are of record in the file of this patent:

UNITED STATES PATENTS

| Number | Name | Date |
|---|---|---|
| 792,961 | Beach | June 20, 1905 |
| 1,056,708 | Nickolai | Mar. 18, 1913 |
| 1,083,451 | Massart | Jan. 6, 1914 |
| 1,127,537 | Starkey | Feb. 9, 1915 |
| 1,221,775 | Thayer | Apr. 3, 1917 |
| 1,824,376 | Shinn | Sept. 22, 1931 |

FOREIGN PATENTS

| Number | Country | Date |
|---|---|---|
| 16,743 | France | Jan. 30, 1913 |
| (Addition to No. 426,247) | | |
| 337,233 | Great Britain | Oct. 30, 1930 |
| 369,742 | Germany | Feb. 22, 1923 |
| 426,247 | France | Apr. 27, 1911 |